UNITED STATES PATENT OFFICE.

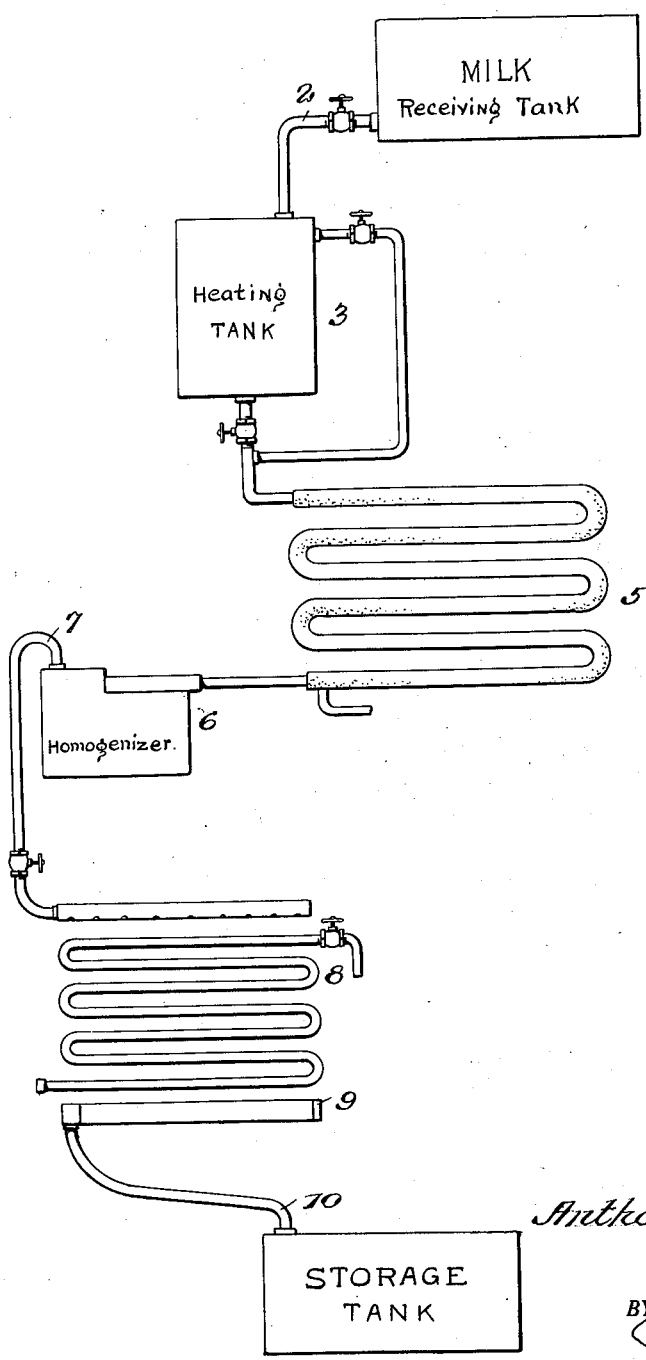

ANTHONY R. SANNA, OF CHEVY CHASE, MARYLAND.

METHOD OF MAKING ICE CREAM.

1,414,214.          Specification of Letters Patent.      Patented Apr. 25, 1922.

Application filed January 19, 1921, Serial No. 438,490. Renewed November 22, 1921. Serial No. 517,151.

*To all whom it may concern:*

Be it known that I, ANTHONY R. SANNA, a citizen of the United States, residing at Chevy Chase, in the county of Montgomery and State of Maryland, have invented certain new and useful Improvements in Methods of Making Ice Cream, of which the following is a specification.

This invention relates to a process designed for the treatment of lacteal fluids, as such term is commonly employed in the manufacture of food products and more particularly ice cream and the like, through which treatment there is produced a product having the desired characteristics and containing the essential ingredients.

In carrying out my invention I have discovered that I may treat whey and collect the milk solids therefrom, in substantially the same manner as in the treatment of milk, and to this extent the present application is to be construed as a continuation of my allowed application for Letters Patent, Serial Number 419,034, filed October 23rd, 1920. Whey contains substantially the same milk solids as milk, but in smaller proportions, and if these solids can be collected economically they can be utilized in the manufacture of ice cream in the same manner as milk. As whey in many large industries is regarded more or less as waste, it is my purpose to treat it according to the present invention, and convert it into a highly efficient food product, i. e., ice cream. Therefore in the following description, of the process, the term milk, where applicable, is to be construed as including whey or other lacteal fluids containing the same constituent elements.

Ordinarily in the treatment of milk, in the manufacture of ice cream or other food products, it is primarily necessary to initially subject the milk to a prolonged treatment in what is commonly known as vacuum tanks to increase the viscosity, and then following the essential pasteurization, which of course reduces such viscosity to allow the material to stand for a considerable period to restore this characteristic. The desired ingredients of milk to be retained under treatment for the particular use defined, are the albuminoids, including casein, and the butter fats, while it is essential to eliminate the inorganic salts and sugar content. This result is attempted in a more or less imperfect manner by the present treatment of milk as above outlined, but in such treatment, on a commercial scale, the apparatus made necessary is expensive, the time period required an essential factor, and the labor of handling a considerable item in the final cost of the product.

The process forming the subject matter of the present invention is designed to secure a more superior product in much less time, and in a more economical manner, than by processes heretofore known to me. In the manufacture of ice cream it is important that the milk sugar (lactose) be eliminated from the milk, for the reason that such milk sugar requires approximately nine times its weight in water to remain in a solution, while cane sugar requires but half its weight in water for solution. Therefore in the prepared milk the milk sugar, not finding a sufficient weight of water to remain in solution will precipitate as a hard crystal, which of course is objectional. Therefore, one of the principal objects of the present invention is combining, under substantial coagulation, the albuminoids, including casein and the butter fats, while separating in the whey, the milk sugar, ash, lime, and other inorganic salts.

This step in the process is an important one as I have discovered that certain of the albuminoids and casein can by a predetermined degree of heat, be brought into substantially the same physical condition, and then treated to maintain this condition in a homogenous mass, while the whey is separated from the milk. By this treatment of the milk subsequent pasteurization is unnecessary, and previous preliminary treatment, as now practiced, is dispensed with.

In the manufacture of ice cream it is usual to homogenize the mix after it comes from the pasteurizer and then pass it over a cooling medium to reduce the temperature and aerate it. I have discovered that the constituents of the mix are more readily susceptible to the homogenizing treatment if the temperature of the mix coming from the pasteurizer is preliminarily reduced just previous to being introduced to the homogenizer.

Therefore one of the objects of this invention is to preliminarily cool the improved mix previous to homogenizing, to better prepare the liquid for emulsification.

In order that the process may be understood, reference is made to the accompanying drawing wherein I have illustrated diagrammatically the various machines employed for carrying out the complete steps for the manufacture of ice cream.

In the drawing 1 indicates a milk receiving tank from which leads a pipe 2, to deliver the milk to a heating tank 3. The milk is heated in the tank to a temperature of approximately 190° F. to 195° F., and is then further treated as will be explained later on.

From the heating tank leads a pipe connected with a preliminary cooling coil 5, provided with appropriate means for cooling the mix as it passes to a homogenizer 6. From the homogenizer leads a pipe 7, to direct the mix to the top of the final cooling and aerating coils 8, at the bottom of which is a collecting trough 9. The cooled aerated mix is then carried through a pipe 10, to an ageing tank from which it may be conveyed to a freezer, if ice cream is to be made, or to smaller shipping containers, if the treated milk is to be used as a specific product.

As stated, the drawing is purely diagramatic, and no attempt has been made to illustrate the details, it being understood that the various elements forming the apparatus are all of well known forms and makes, and specifically forms no part of the present invention.

In carrying out the process the milk with or without previous treatment, is stored in the receiving tank 1, and a charge therefrom is introduced through pipe 2, to the heating tank 3. Sugar, and other ingredients if necessary are introduced to the milk in the heating tank, and the temperature of the milk is raised to approximately 190° F. or 195° F. to cause the albuminoids, other than the casein, and the casein to reach substantially a similar condition.

When the desired temperature of the mix has been reached, an acid is added with the result of coagulation of the homogeneous mass of albuminoids, casein, and butter fats, and the coagulates will rise to the top or be precipitated, depending upon the condition, age and character of the milk.

This part of the process may be defined as the most important, and consists essentially of two steps; first, a heating treatment of the milk to a predetermined degree; and, second, the use of an acid with the heated milk.

As a result of the first step, the albuminoids other than casein and the casein, are brought to a similar condition so that an effective coagulation may be produced. As the albuminoids other than the casein harden under heat, and casein softens under heat, the temperature is regulated to bring the two constituents to a point where they adhere. Ordinarily the albuminoids other than casein are comparatively soft while the casein is comparatively hard. As the heat reversely effects these albuminoids other than casein and also casein, it follows that under a predetermined degree of heat such albuminoids and casein will reach substantially the same physical condition if an acid is added. If at this time, that is at this period of treatment, an acid is added to the milk, there results a coagulation of the homogenous mass of albuminoids, casein and butter fats, and the coagulates will under some conditions, rise to the top or under other conditions be precipitated. In either case there is distinct separation, permitting the operator to draw off the whey containing the undesirable constituents heretofore referred to.

It has been found, and is here contemplated as an essential part of the process where heat treatment is necessary, that an initial temperature of substantially 190° to 195° F., will result in that desired physical similarity between the casein and other albuminoids as will permit of their intermingling as a homogeneous mass, and that following the introduction of the acid above referred to the degree of heat is no longer essential, and may be permitted to be reduced.

It has been found in actual practice that the age and character of the milk is to a large extent the determining factor of the degree of heat necessary to bring about the adhesion of the albuminoids and casein, to the extent necessary for the acid to act in the separation of the solids and the whey. It is therefore to be distinctly understood that while the degree of temperature noted is preferable, yet this is not binding, as the heat, whatever degree employed, is only essential to combine the albuminoids and casein, and where by tests it has been found that this has been accomplished, the acid can be applied. In fact, I have demonstrated by actual practice that the acid may be introduced to the milk while in a cool state, and then heat applied and not only is effectual separation produced, but the desired adhesion of the albuminoids and casein and subsequent coagulation is likewise effected. My invention, therefore, so far as the heating and introduction of the acid is concerned, is in no way to be construed as limited to first heating and then adding the acid, or first adding the acid and subsequently heating, either serving to effect the result when circumstances will permit.

After the whey is drawn off the coagulated mass is permitted to settle and in the settling it becomes flocculent, due largely to the elimination of the greater part of the water and the milk sugar, etc.

Following the production of the coagulates as described, the whey is carried off and the coagulates are then passed through the pre-cooler 5, from which it passes into the homogenizer. The homogenizing action is materially enhanced by reducing the coagulating temperature as thereby a substantial emulsification is more readily effected. This is doubtless due to the fact that any globules which are dissipated to a large extent by high temperature tend to assume a more natural condition under a lower temperature, with the result that in the homogenizing action the globules or increments in a partial solid state are more readily broken up and their identity is thoroughly destroyed in the emulsifying action.

After the mix passes through the homogenizer, it passes through the pipe to the top of the final cooling and aerating coils, where it flows by gravity to the trough. The temperature of the mix is approximately 120° F. to 124° F., when it reaches the trough its temperature approximates 32° F. or 34° F. From the trough the mix is carried to the ageing tank for future use.

The cooling steps prevent further separation of the whey and result in a product in the nature of a pasty mass which may be properly conducted through pipes or the like. In the homogenizing step the fat globules are broken up as such and the whole product thoroughly mixed into an inseparable mass made up largely of fat, casein, albuminoids, and such slight proportions of sugar, ash and inorganic salts that may be present. In other words, as stated, the mass is emulsified.

The product has now become a concentrated milk and may be used in the manufacture of ice cream as an entirety by the addition of flavor, etc., and frozen in the usual manner. It can also be used in part as milk solids in the mix prior to being frozen.

The essential steps of the process as herein described are that of so treating the milk as to change the physical nature of the casein and other albuminoids that their condition may be made substantially similar for the purpose of causing more or less adhesion between them to form a substantially homogeneous mass, and while I have found that this result can be readily and simply obtained by the use of a substantially determined degree of heat, it is nevertheless to be understood that the result gained by this step, that is, the bringing together of the albuminoids and the casein is so far as I am aware new, in the production of milk solids, and hence it is to be understood that this step of the process is in no wise limited to the use of heat, as it may be possible that a chemical combination may produce the desired result with or without heat. For the purposes of this application the process may be defined as changing the physical characteristics of casein, and other albuminoids in a milk product, to cause said casein and albuminoids to reach that physical condition as will permit of their adhesion in a homogeneous mass.

The second step of the process, that of coagulation by acid is capable of being carried out by a great variety of acids, either organic or inorganic, depending somewhat on the nature and characteristics and conditions of the milk, and the use to be made of the final treated product, and therefore the use of any appropriate acid is contemplated as within this step.

One of the decided advantages of the process resides in the fact that the milk sugar is so reduced to a minimum as to leave only albuminoids and casein as solids. Hence as milk sugar has a very low refrigerating point, and as such milk sugar is removed, and as the coagulated albuminoids and casein can be frozen at a much higher refrigerating point, the mix can be frozen in a much shorter time than at present, when the product is made into ice cream.

Then again the solids are so intermingled and worked into each other, particularly the butter fats, that the cream is "smooth" and exceedingly tasty.

Furthermore by bringing the casein and albuminoids to a state of substantial adherence, as herein set forth, the proteids are increased in the ice cream. In present methods of making ice cream with condensed milk, from ten to twenty-five per cent milk sugar is carried into the mix, but by the method described milk sugar is reduced from one to three per cent.

As previously pointed out the process described will efficiently treat whey, and from the product obtained ice cream can be manufactured. Owing to the relatively small proportion of milk solids in whey, the bulk of whey treated will be considerably greater than the bulk of milk, to collect a determinate quantity of milk solids. This, obviously is due to the fact that the relative proportion of milk solids in the whey is considerably less than that found in milk. However, as whey is a cheap product, and to collect the solids is largely a question of removal of the large amount of contained water, it follows that the solids can be quickly and economically collected and converted into a commercial commodity. For instance in cheese and other factories where whey is a by-product resulting from the manufacture of other products, it is my purpose to treat the whey and collect the casein, other albuminoids and fats in a concentrated mass as previously described, and ship same to points where it is desired to manufacture ice cream. The concentrate can be preserved and utilized at the manufacturing plant in making ice cream or other food products by continuing the process hereinbefore set forth.

In pasteurizing the mix now used in the manufacture of ice cream, the mix is more or less caramelized, or cooked, the taste in the resultant ice cream being perceptible. This objectional flavor is removed when the mix is treated as above described.

It has also been found that my process supersaturates the milk with proteids without increasing the milk sugar beyond the proportion of such milk sugar in the normal milk, a condition which is highly beneficial to the final products. It therefore follows that the necessary proteids in the mix are obtained without the employment of additional milk sugar.

The improved process not only eliminates the milk treatment heretofore necessary, particularly in ice cream making, involving the vacuum tanks and separate steps of pasteurizing, but by reason of the separation of undesirable ingredients, a richer, smoother, and stronger body base for the ice cream mixture is produced.

What I claim is:—

1. The process of treating milk for use in making ice cream consisting in collecting the casein, other albuminoids and fats into a substantially homogeneous mass, and coagulating the same to form a concentrated solution and subsequently freezing the same.

2. The process of treating milk for use in making ice cream consisting in collecting the casein, other albuminoids and fats into a homogeneous mass, and coagulating the same.

3. The process of treating milk for obtaining milk solids, consisting in changing the physical characteristics of casein and other albuminoids to cause such to adhere, and coagulating the same, and concentrating the same by separating a part of the whey therefrom.

4. The treatment of lacteal fluids to obtain characteristic solids therefrom, consisting in heating the lacteal fluid to cause adherence between casein and other albuminoids, and coagulating the same by acid to form a substantially homogeneous mass, and separating the whey.

5. The treatment of milk in the manufacture of ice cream consisting in subjecting the milk to a predetermined heat degree to form a substantially homogeneous mass of the casein and other albuminoids, and in separating such mass by coagulation from the other constituents of milk.

6. The treatment of lacteal fluids in the manufacture of ice cream consisting in subjecting the lacteal fluid to a predetermined heat degree to form a homogeneous mass of the casein and other albuminoids and in separating such mass by coagulation from the other constituents of lacteal fluid by acid.

7. The treatment of milk to obtain certain solids in a homogeneous mass, consisting in heating the milk to substantially 190° F., and adding an acid.

8. The process of treating milk for use in making ice cream, consisting in the employment of heat and an acid to bring the albuminoids and casein to a condition where they are of such consistency as to adhere and cause coagulation of the mass.

9. The process of making a food product from milk consisting in employing heat and acid to bring the albuminoids and casein to a condition where they are of such consistency as to adhere and cause coagulation of the mass, and subsequently homogenizing the mass to cause substantial emulsification of the mass.

10. The process of making a food product from milk consisting in the employment of heat and acid to bring the albuminoids and casein to a condition where they are of such consistency as to adhere and cause coagulation of the mass, thereafter causing a gradual reduction of the temperature of the mass, then homogenizing the mass, and subsequently further gradually reducing the temperature.

11. The process of making a food product consisting in treating milk to bring the casein and other albuminoids in substantially the same physical condition to permit the separation of the whey therefrom, then separating the whey.

12. The process of producing ice cream, consisting in treating a determined quantity of lacteal fluid to bring the albuminoids and casein to a condition where they are of such consistency as to adhere and cause coagulation of the mass and super-saturate same with proteids contained in said determined quantity of lacteal fluid without increasing the milk sugar beyond the proportion of the same in the normal lacteal fluid, and thereafter freezing the mass.

13. The process of treating lacteal fluids for use in making ice cream consisting in collecting the casein and other albuminoids into a substantially homogeneous mass and coagulating the same to form a concentrated solution, and subsequently freezing the same.

14. The process of treating lacteal fluids for obtaining milk solids, consisting in changing the physical characteristics of casein and other albuminoids to cause such to adhere, and coagulating same, and concentrating the same by separating the water and like therefrom.

15. The process of making a food product from lacteal fluid consisting in employing heat and acid to bring the albuminoids and casein to a condition where they are of such consistency as to adhere and cause coagulation of the mass, and subsequently homogenizing the mass to cause substantial emulsification of the mass.

16. The process of making a food product from lacteal fluid consisting in employing heat and acid to bring the albuminoids and casein to a condition where they are of such consistency as to adhere and cause coagulation of the mass, subsequently homogenizing the mass, and before and after the homogenizing causing a gradual reduction of temperature of the mass.

In testimony whereof I affix my signature.

ANTHONY R. SANNA.